Aug. 16, 1927.

G. P. INGRAM 1,639,183

PLIERS

Filed March 18, 1926

INVENTOR
George P. Ingram
BY John A. Naismith
ATTORNEY

Patented Aug. 16, 1927.

1,639,183

UNITED STATES PATENT OFFICE.

GEORGE P. INGRAM, OF SAN JOSE, CALIFORNIA.

PLIERS.

Application filed March 18, 1926. Serial No. 95,663.

One of the most serious faults of pliers as now commonly constructed is that when the jaws are clamped upon an object they necessarily assume an angular position relative to each other. This angularity is obviously great when the object grasped is of considerable size, and the greater the angularity between the two jaws the less effective is the grip obtained upon the object.

It is one object of the present invention to provide a plier construction wherein the act of clamping the jaws upon an object automatically moves the jaws into a substantially parallel position relative to each other whereby those portions of the two jaws in actual gripping contact with the object are diametrically opposite each other and a most effective grip obtained.

It is another object of the invention to provide a plier of the character indicated provided with simple and effective means for holding the plier parts in a fixed position relative to each other when the jaws have assumed a relatively parallel position.

It is also an object to provide a device of the character indicated that will be simple in form and construction, economical to manufacture, and highly efficient in its practical application.

In the drawing:—

Figure 1:
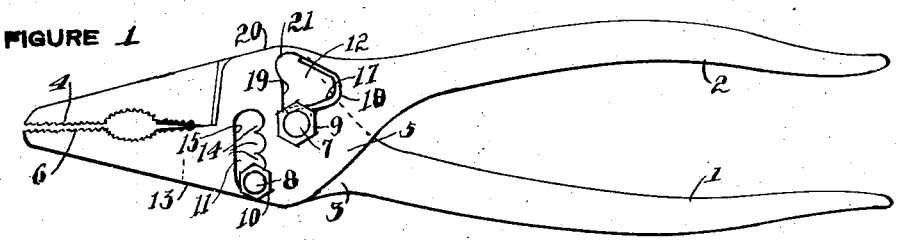
Figure 1 is an illustration of a pair of pliers embodying my invention with the parts in a normal position.

Referring more particularly to the drawing, I show at 1 and 2 the two handles of the device, the handle 1 widening out to form the plate portion 3 which in turn carries the jaw 4. The handle 2 widens out to form the plate portion 5 which in turn carries the jaw 6. These two parts 1, 3, 4 and 2, 5, 6 are arranged in opposed relation to each other and crossing each other in the well known manner with the plates 3 and 5 contacting on their inner surfaces, the plane of the contacting surfaces lying in the median plane of the device at right angles to the grasping surfaces of the jaws.

Mounted fixedly in plate 3 and at right angles thereto on the side facing plate 5, are two pins 7 and 8 respectively fitted with riveted heads 9 and 10. The pin 7 is arranged in substantial alignment with the gripping face of jaw 4, and the pin 8 is arranged or positioned at a point near the edge of plate 3 remote from jaw 4 and adjacent the handle 1. In order to secure the leverage hereinafter referred to, the pin 7 is positioned at a greater distance from the point of jaw 4 than pin 8, as clearly shown in the drawing.

In the plate 5 of the part 2, 5, 6, are formed two slots 11 and 12 respectively. The slot 11 extends from a point adjacent edge 13 crosswise of the plate to a point somewhat beyond the center line thereof as shown and has a plurality of indentations formed in the edge remote from the jaw 6 as indicated at 14. The slot 11 engages the pin 8 in such a manner that the pin 8 may slide along its forward edge 15 or engage any one of the indentations 14 as its use requires.

The slot 12 engages pin 7 and normally provides a seat therefor at 16 in which seat it is held by a spring 17 seated in portion 18 of the slot 12 as shown. The side edge 19 of slot 12 preferably lies parallel with edge 15 of slot 11 and extends to a point adjacent to the opposite edge 20 of plate 5 where it is provided with a recess 21 to receive pin 8.

The construction and arrangement of these several parts as described, permits the device to operate in the following manner. When the pliers are in a normal inoperative position the several parts assume the positions shown in Figure 1, the spring 17 urging the pins 7 and 8 into the ends of the slots 11 and 12 as shown.

Figure 2:
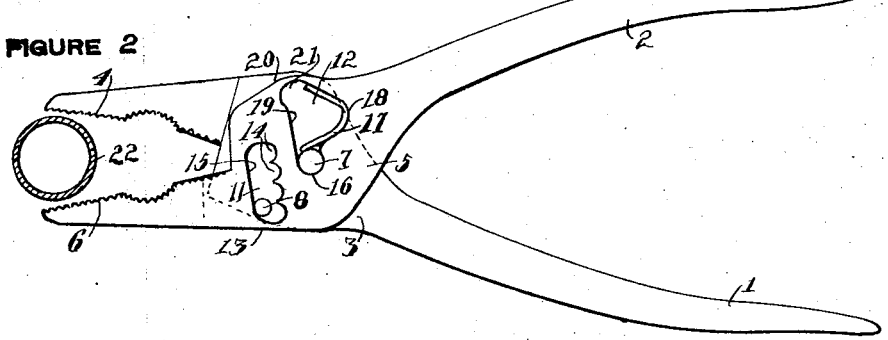
Figure 2 is another illustration of the same with the parts extended and in a position to grasp an object.
Figure 3:
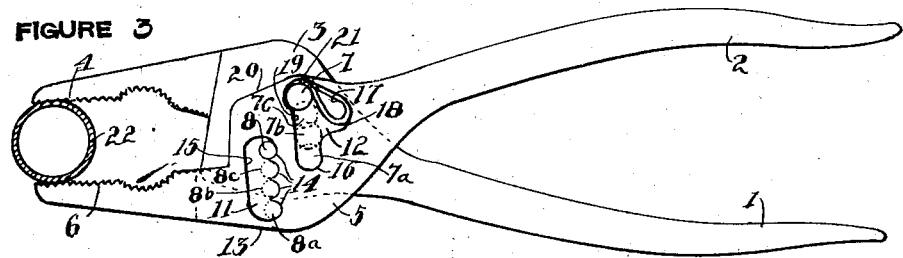
Figure 3 is still another illustration of the same with the jaws tightly grasping an object.

When the handles 1 and 2 are extended in order to place the jaws 4 and 6 over an object as 22, then the part 2, 5, 6 pivots about pin 7 which remains in its seat 16. The pin 8, however, is moved out of its normal position until it bears against edge 15 of slot 11 as shown in Figure 2. The handles 1 and 2 now being forced together in the usual manner the pin 7 is forced to slide along edge 19 of slot 12 until it seats at 21 whereupon part 2, 5, 6 pivots upon it and pin 8 is swung into the innermost indentation 14 as shown in Figure 3. This action of the plier elements throws the jaws 4 and 6 into parallel relation to each other and secures a much more positive grip on the element 22 than would be the case if the jaws were maintained in angular relation to each other. The provision of the recess 21 and the arrangement of the spring is such that the plier parts are held in this open position even when the handles 1 and 2 are released, but the jaws are quickly spread by spreading the handles 1 and 2 and allowing the spring to throw the pin 7 back into the seat 16.

While the action of the device has been illustrated when applied to a relatively large object 22, its action is substantially the same when applied to smaller objects, the positions of the pins 7 and 8 being indicated at 7ª, 7ᵇ, 7ᶜ and 8ª, 8ᵇ, 8ᶜ respectively these being the positions assumed by the pins when the pliers are used upon smaller objects.

In Figures 2 and 3 the rivet heads have been left off of the pins 7 and 8 to more clearly show their several positions.

It is to be understood, of course, that while I have herein shown and described but one specific embodiment of the invention, changes in form, construction and method of operation may be made within the scope of the appended claims.

I claim:

1. A device of the character described, comprising a pair of pivoted and relatively slidable coacting jaws provided with handles, one jaw having a pivot mounted thereon and the other jaw having a slot formed therein to receive said pivot and extending from a point in substantial alignment with its gripping face to a point adjacent the edge extending forwardy of said face, and resilient means for normally holding the pivot seated in the first mentioned end of said slot.

2. A device of the character described, comprising a pair of pivoted and relatively slidable coacting jaws provided with handles, one jaw having a pivot mounted thereon and the other jaw having a slot formed therein to receive said pivot and extending from a point in substantial alignment with its gripping face to a point adjacent the edge extending forwardly of said face and having a recess formed in said last mentioned end, and resilient means for normally holding the pivot seated in the end of the slot remote from said recess.

3. A device of the character described, comprising a pair of relatively slidable coacting jaws provided with handles, one jaw having a pair of substantially parallelly arranged slots formed therein and extending in opposite directions from the center of said plate, and the other jaw having pins set therein to engage corresponding ends of said slots when the device is in a normal position, one of said slots having a recess formed therein at a point remote from the other slot and resilient means for urging the pin in said slot away from said recess.

4. A device of the character described comprising a pair of relatively slidable and coacting jaws provided with handles, one jaw having a pair of substantially parallelly arranged slots formed therein and extending in opposite directions from the center of said jaw and one of said slots having a plurality of indentations formed in one edge thereof and the other slot having a recess formed therein at a point remote from said first slot, and the other jaw having pins set therein to engage the corresponding ends of said slots when the device is in a normal position.

GEORGE P. INGRAM.